(12) United States Patent
Karthikeyan

(10) Patent No.: US 9,096,439 B2
(45) Date of Patent: Aug. 4, 2015

(54) RAPID, NON-PYROLYTIC METHOD OF MAKING ACTIVATED CARBON

(71) Applicant: WISYS TECHNOLOGY, Madison, WI (US)

(72) Inventor: Annamalai Karthikeyan, Oshkosh, WI (US)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 96 days.

(21) Appl. No.: 13/945,114

(22) Filed: Jul. 18, 2013

(65) Prior Publication Data

US 2014/0161709 A1     Jun. 12, 2014

Related U.S. Application Data

(60) Provisional application No. 61/734,464, filed on Dec. 7, 2012.

(51) Int. Cl.
*C01B 31/02* (2006.01)
*C01B 31/12* (2006.01)

(52) U.S. Cl.
CPC ................ *C01B 31/12* (2013.01); *C01B 31/02* (2013.01)

(58) Field of Classification Search
CPC ....................................................... C01B 31/02
See application file for complete search history.

(56) References Cited

U.S. PATENT DOCUMENTS

| | | | |
|---|---|---|---|
| 4,425,256 A | 1/1984 | Pilipski | |
| 5,416,056 A | 5/1995 | Baker | |
| 7,199,080 B2 | 4/2007 | Freel et al. | |
| 8,017,550 B2 * | 9/2011 | Chao et al. | 502/417 |
| 8,198,211 B2 * | 6/2012 | Johnson et al. | 502/426 |
| 8,377,843 B2 | 2/2013 | Baker | |

OTHER PUBLICATIONS

Nelson, Jr., Ralph D.; Lide, Jr., David R.; Maryott, Arthur A, "Selected Values of Electric Dipole Moments for Molecules in the Gas Phase", NSRDS-NBS 10 (National Standard Reference Data Series-National bureau of Standards 10), Category 3-Atomic and Molecular Properties issued Sep. 1, 1967, pp. iii-49, U.S. Department of Commerce, Washington, D.C.

* cited by examiner

*Primary Examiner* — Stuart Hendrickson
(74) *Attorney, Agent, or Firm* — Boyle Fredrickson, S.C.

(57) ABSTRACT

High-speed formation of char, useful as a precursor to activated carbon, is produced by a combination of cellulosic material and an acid solution both preheated close to the steam temperature and then mixed. The rapid endothermic reaction rapidly chars the cellulosic material driving excess water away as steam and minimizing tar formation.

15 Claims, 3 Drawing Sheets

RAPID, NON-PYROLYTIC METHOD OF MAKING ACTIVATED CARBON

CROSS REFERENCE TO RELATED APPLICATION

This application claims the benefit of U.S. Provisional Application 61/734,464 filed Dec. 7, 2012 and hereby incorporated by reference.

BACKGROUND OF THE INVENTION

The present invention relates to a method of making activated carbon and, in particular, a process that can be performed rapidly in an open atmosphere with reduced or no tar formation.

Activated carbon or activated charcoal is a versatile material having very high specific surface area arising from its structurally porous form of carbon. Based on the dimension of the pores, they are classified as micro, meso and macro porous carbon respectively with characteristic pore dimensions around <2 nm, 2-50 nm, and >50 nm, according to IUPAC standards. The specific surface area of activated carbon can vary from 200 $M^2/g$ to 2000 $M^2/g$. Activated carbons are widely used in purification of water and other liquids, air purification, solvent recovery, chemical catalysis, electrochemical device components and other wide variety of industrial processing.

Activated carbon is generally prepared by pyrolysis of carbon precursor material, by heating material to a temperature greater than 500° Celsius in an oxygen free environment. This enables removal of volatile materials and liquid pitch leaving behind char, a carbon rich material. This carbonized product is then activated at temperatures above 800° Celsius under steam or $CO_2$ to promote reactions that enable pore formation. Carbon precursor materials are various plant products generally described as biomass.

Control over porosity of activated carbon can be obtained by using a chemical activation agent such as zinc chloride, potassium hydroxide, or sodium hydroxide mixed with carbonized product, usually less than 10% by weight of carbon precursors. These chemical agents act as a template for the creation of pore structure during activation. In some preparation routes, the chemical reagent is added to the uncarbonized precursor material and a pyrolysis process is carried out to prepare a carbonized product and then the material is activated. In either of these processes, elimination of the reagents by additional chemical reactions and subsequent washing is required to obtain activated carbon.

SUMMARY OF THE INVENTION

The present invention provides a method of forming char precursor for activated carbon using a process that can be performed in an open atmosphere (as opposed to pyrolysis which requires exclusion of oxygen). By preheating the precursor materials, extremely rapid char formation is obtained that drives off water to produce a high carbon content char with no or low tar formation.

Specifically, the present invention provides a method of carbonizing cellulosic materials comprising the steps of (a) granularizing the cellulosic material; (b) heating the cellulosic material to above the steam point; and (c) combining the heated cellulosic material with a heated liquid acid solution in a weight ratio of at least 0.75:1 liquid acid to cellulosic material to create a mixture at a temperature above the steam point to strip hydroxyl groups from the cellulosic material in a catalytic reaction with the heated acid and to outgas resulting water as steam to produce a substantially water-free char.

It is thus a feature of at least one embodiment of the invention to provide a simple process to convert cellulosic precursor materials to carbon that can be conducted rapidly by using relatively large proportions of liquid acid solution.

The method may further include the step of activating the char at high temperatures to produce activated carbon.

It is thus a feature of at least one embodiment of the invention to provide activated carbon.

The liquid acid solution may be pre-heated to temperatures no less than 80 degrees Celsius.

It is thus a feature of at least one embodiment of the invention to promote rapid reaction that reduces processing costs and avoids tar formation.

The cellulosic material at step (b) may be heated to no less than 120 degrees Celsius.

It is thus an object of at least one embodiment of the invention to promote reaction temperatures that convert water to steam, the latter of which may be expressed from the char.

The liquid acid solution may include sulfuric acid and water and may further include phosphoric acid. The acid of the liquid acid solution may be, for example, 70 to 90 percent by volume sulfuric acid and 5 to 30 percent by volume phosphoric acid.

It is thus a feature of at least one embodiment of the invention to provide a catalytic material for rapid char formation.

The liquid acid solution may further include a metallic salt.

It is thus a feature of at least one embodiment of the invention to introduce an activation agent during the char formation for simplified processing.

The granularizing may provide particles having at least one dimension of substantially less than four millimeters.

It is thus a feature of at least one embodiment of the invention to increase the reaction area to favorably promote a rapid char formation with little or no tar.

The method may include washing the char to separate out a solidified acid solution and concentrating the solution for use again in step (c).

It is thus a feature of at least one embodiment of the invention to recycle the liquid acid solution for improved process efficiency and its economics.

The method may further include the step of trapping the steam and other residual vapors in a condenser for reuse.

It is thus a feature of at least one embodiment of the invention to reduce the usage of water and other resources.

These particular objects and advantages may apply to only some embodiments falling within the claims and thus do not define the scope of the invention.

DETAILED DESCRIPTION OF THE PREFERRED EMBODIMENT

Figure 1:
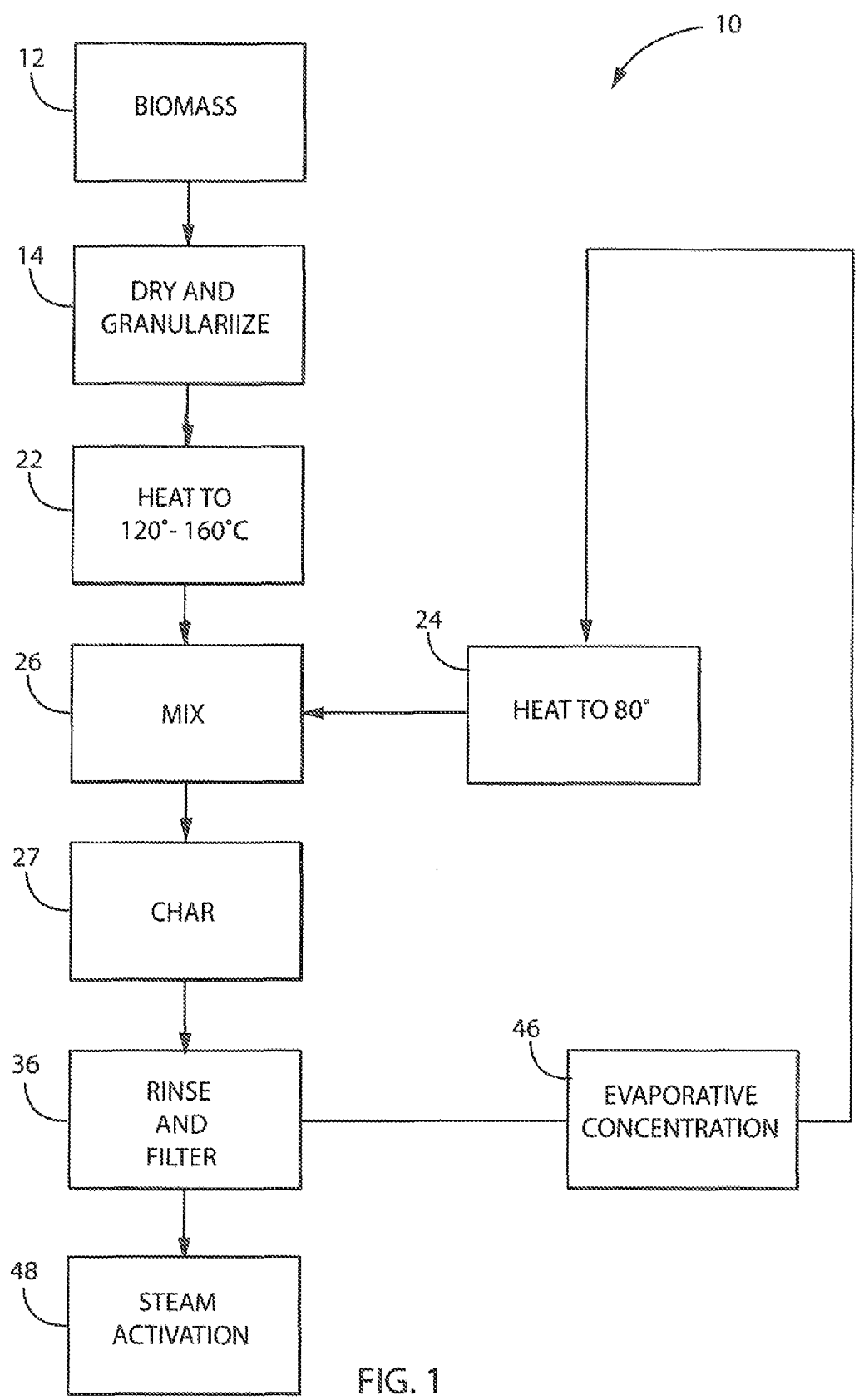
FIG. 1 is a flowchart of the principal steps of the present invention.
Figure 2:
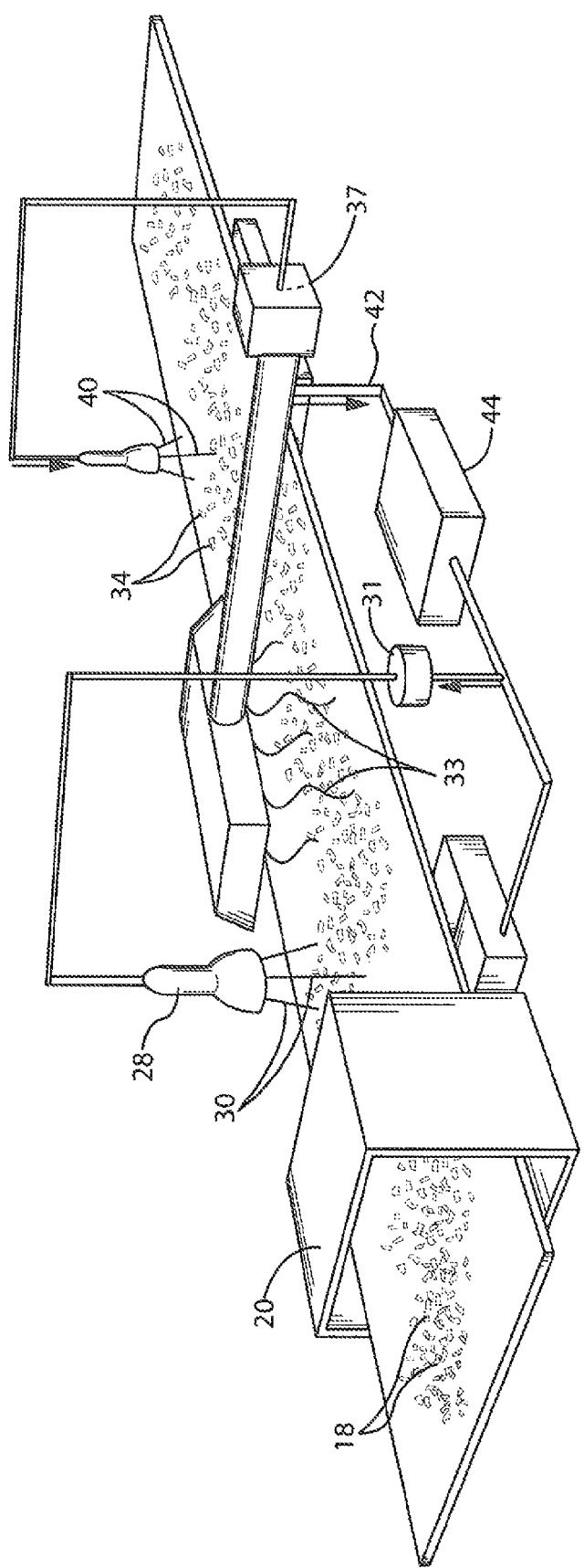
FIG. 2 is a simplified diagram of a continuous process for char formation using the present invention.

Referring now to FIGS. 1 and 2, a method 10 for the production of char, for example, as a feedstock for the manufacture of activated carbon and, in particular, a method for production of char that may work with a cellulosic precursor 18 received as indicated by process block 12 to be dried and granulated as indicated by process block 14. The cellulosic precursor 18 may be, for example, biomass including plant products, wood products and paper products including domestic and industrial wastes, the latter including but not limited to sawdust, used Kraft paper, and paper mill sludge.

The granularization process may cut, clip, or pulverize the cellulosic precursor 18 to have at least one dimension less than three millimeters with 0.5 millimeters to one millimeters preferred for high-speed carbonization and two millimeters to three millimeters preferred for a lower speed carbonization.

The granularized cellulosic precursor 18 may then be heated in an oven 20 open to the atmosphere, as indicated by process block 22, to a temperature of 120 degrees to 160 degrees Celsius.

At the same time and as indicated by process block 24, a catalytic liquid acid solution 30 may be pre-heated to a temperature of 80 degrees Celsius, using a preheater 31, to be as hot as practical yet in a temperature below the steam temperature of liquid water to prevent boiling. The liquid acid solution 30 may be a mixture of acids in water including sulfuric acid and phosphoric acid and in one embodiment includes an acid component being 70 to 90 percent by volume sulfuric acid and 5 to 30 percent by volume phosphoric acid. The acid component is mixed with water, the former forming about 85 to 95 percent by weight of the liquid acid solution 30. Also included in the liquid acid solution 30 may be a chemical activation agent, e.g., metallic salts such as potassium sulfate, sodium phosphate or zinc chloride.

The amount of liquid acid solution 30 by weight will be comparable to the weight of the granule eyes cellulosic precursor 18, for example, in a ratio of greater than 0.5:1 by weight of liquid acid solution 32 cellulosic precursor 18 and preferably in a ratio of greater than 0.75:1 liquid acid solution 32 to cellulosic precursor 18 and typically in a ratio greater than 1:1 of liquid acid solution 32 to cellulosic precursor 18.

As indicated by process block 26, the heated liquid acid solution 30 may then be mixed with the granulized cellulosic precursor 18 and agitated (either mechanically or by action of the spray nozzle 28 or by the action of auger conveyer) to promote a rapid reaction in which hydroxyl groups are stripped from the cellulosic precursor 18, the latter including cellulose, hemi-cellulose and lignin, in a catalytic reaction, to outgas water as steam 33 leaving behind a dry or semidry char 34 with no or low levels of tar and a solid or semisolid acid as indicated by process block 27. From 50 to 300 percent weight of liquid acid solution 30 is used with respect to the weight of granulized cellulosic precursor 18.

The expressed steam may be collected by a condenser 37 and the collected water and any catalyst vapor residuals recycled as will be described below.

During this heating and mixing process, the granulized cellulosic precursor 18 may be at all times open to the atmosphere and thus exposed to atmospheric oxygen or carried out in a enclosed conveyer in order to efficiently collect the water vapor and residual vapors; with or without the aid of carrier air flow. At the conclusion of this process of process block 26, the cellulosic precursor 18 has been endothermically chared and is dry or semidry.

As indicated by process block 36, the resulting char 34 is then rinsed with water 40 to remove a concentrated "super acid" being the residue of the heated liquid acid solution 30 and the rinsed char 34 filtered out. The rinse water 42 is then sent to a reclaimer unit 44 which recovers the liquid acid solution 30 for use at process block 24, for example, by distillation, as indicated by process block 46. About 50 to 95 percent of the catalyst is recovered.

The char 34 is then treated as indicated by process block 48 to activate the char 34, for example, using steam or carbon dioxide to create microporous structure resulting in activated carbon. It is believed that the high-speed carbonization process improves the internal morphology of the carbon char that facilitates efficient micropore formation. This activation process may be conducted at a temperature in the range of 600 degrees Celsius to 1000 degrees Celsius.

EXAMPLE I

Pieces of dry waste wood, categorized as common SPF (spruce-pine-fir) wood, was pulverized in a mill and screened using a mesh size #18 (~1 mm). 20 grams of this fine sawdust was taken in a 600 ml beaker and placed in an electric oven pre-heated to 140° Celsius and heated for about 40 min. A closed oven is preferred to achieve uniform heating of the raw material quickly but does not provide significant oxygen exclusion. The heating is controlled to prevent excess temperature that would result in loss of useful constituents of the biomass that has lower thermal stability (e.g., lignin).

In a separate beaker, 25 ml of sulfuric acid having a concentration of 95% (5% water) and 5 ml of phosphoric acid having a concentration of 85% (15% water) is mixed using a glass rod. This catalyst mixture is placed on a hot plate or in an oven maintained at 80° Celsius and warmed to 80° Celsius.

The warm cellulosic raw material is removed from the oven and the catalyst poured quickly onto the raw material. The biomass converts to bio-char, substantially instantaneously liberating steam. The mixture is stirred well for reaction uniformity and to remove steam efficiently. The result is a black semi-solid mixture containing bio-char and semi-dry catalyst. No liquid or tar formation is apparent.

The resulting mixture of bio-char and semi-solid catalyst is cooled below 60° Celsius. About 1 liter of water at room temperature is added to a large vessel and the mix added and stirred. This dilutes the remaining catalyst with water and rinses the char. The char is then filtered using a membrane filter. The filtered water catalyst mixture is clear and is then concentrated to the required strength by evaporating the water. The recycled catalyst is used again by repeating the procedures mentioned above. Periodic acid-base titrations are carried out to test the catalyst recovery and reconditioning.

Activation of the char is then performed by loading the char into in a sealed tubular furnace. Steam is passed through a tube using nitrogen as carrier gas. The furnace is heated to 900° Celsius for two hours and cooled. This results in the formation of highly porous activated carbon.

Figure 3:
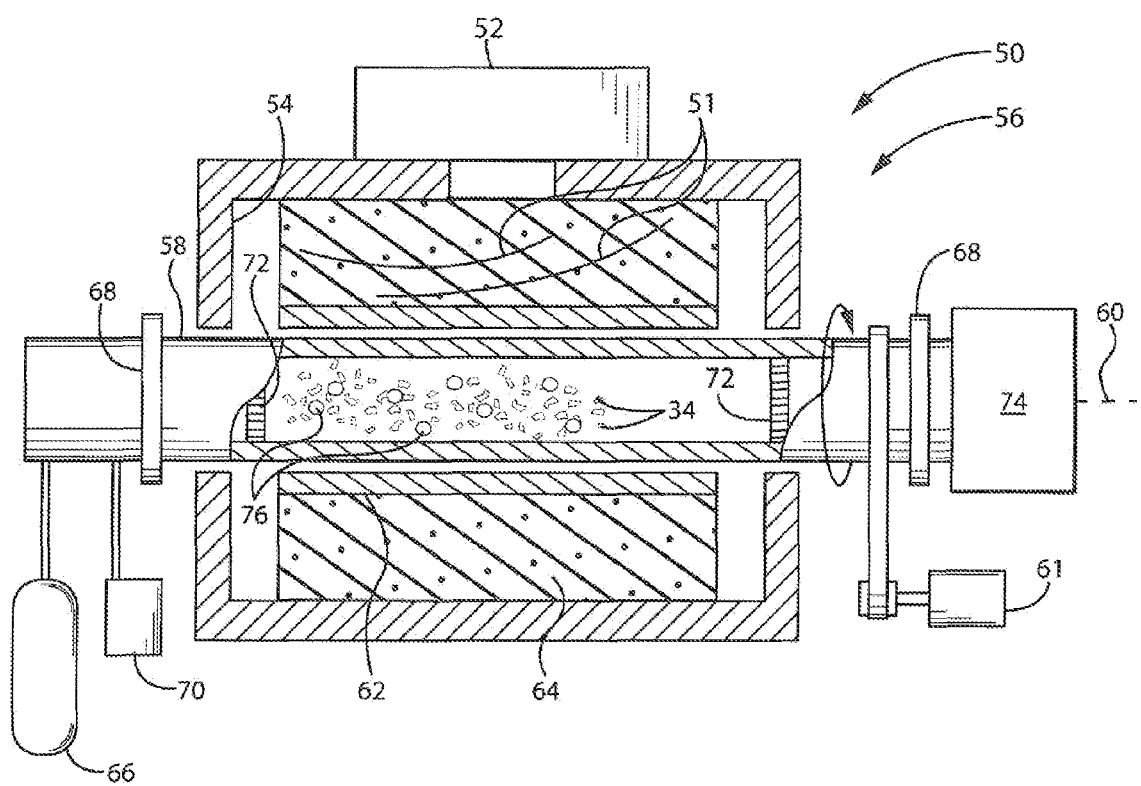
FIG. 3 is a side sectional view of one embodiment of the invention whereby char activation occurs within a sealed tubular furnace.

In one embodiment, as seen in FIG. 3, the char 34 is within a sealed tubular furnace 50 and may be heated by microwave radiation 51 from a magnetron 52 or the like within a closed microwave cavity 54 forming a microwave oven 56. A microwave oven 56 operating at 2.4 gigahertz and providing 1 to 2 kilowatts of power may be suitable for this purpose.

In particular, the char 34 may be loaded inside a horizontal quartz reactor tube 58 rotated about its axis 60 by motor 61 within the microwave oven 56 during the microwave irradiation. The quartz reactor tube 58 within the microwave cavity 54 may be surrounded by a stationary or rotatable sleeve of a susceptor material 62, for example, a mixture of metal and ceramic materials, which in turn is surrounded by a thermal insulator 64 that is otherwise transparent to microwave energy to promote the heating process and concentrate the heat within the quartz reactor tube 58. The quartz reactor tube 58 may be flushed with a reactive or inert gas 66 and steam 70 (for example, introduced into the quartz reactor tube 58 by rotating coupler 68) during the heating process and may provide reflectors 72 (for example, perforated metal plates) to contain microwave energy within the microwave cavity 54 while allowing communication to ends of the quartz reactor tube 58 during the irradiation process.

A scrubber 74 may be attached to the output of the quartz reactor tube 58 to capture incidental volatile compounds formed during the activation process. The remaining moisture in the char from the formation of char 34 provided above may be used in the activation process without the introduction of steam 70 as discussed above or additional moisture may be added. Prior to microwave irradiation, the char 34 may be treated with small amounts of alkali salts or metal salts 76 being ionic and having a dipole moment of greater than 5 (in units of Debye, D) to absorb microwaves and to create a tuned pore structure.

The following materials were produced using this process.

TABLE 1

| Sample | Raw material | Steam activation temperature (° C.) | BET Surface area by $N_2$ Adsorption $M^2/g$ | Micropore volume cc/g |
|---|---|---|---|---|
| A | Cardboard waste | 800 | 875 | 0.37 |
| B | Cardboard waste | 900 | 1200 | 0.48 |
| C | Wood fiber | 900 | 1650 | 0.68 |
| D | Wood fiber | 900, longer time | 2060 | 0.71 |
| E | Wood fiber | 975, higher flow | 2560 | 0.8 |

In some embodiments, the BET surface area of the activated carbon obtained by the invention is about 600 to 1500 $M^2/g$; or about 1500 to 3000 $M^2/g$. Activated carbon has a total pore volume of about 0.2 to 1.0 cc/g; or about 0.5 cc/g to 2.0 cc/g and micropore diameter about 15 to 30 Angstroms; such as about 20 to 30 Angstroms. Generally it is believed that the liquid acid solution operates as a catalyst. It is believed that other materials may be mixed in this catalyst, for example, alkali sulfates, alkali halides, alkali phosphates, transition metal chlorides and metal sulfides.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

I claim:

1. A method of carbonizing cellulosic materials comprising the steps of:
    (a) granulizing the cellulosic material;
    (b) heating the cellulosic material to above the steam point;
    (c) combining the heated cellulosic material with a heated liquid acid solution in a weight ratio of at least 0.5:1 liquid acid to cellulosic material to create a mixture at a temperature above a steam point to strip hydroxyl groups from the cellulosic material in a catalytic reaction with the heated acid and to outgas resulting water as steam to produce a low water content char; and
    (d) washing the char to separate out a liquid acid solution and concentrating the solution for use again in step (c).

2. The method of claim 1 further including the step of activating the char at high temperatures to produce activated carbon.

3. The method of claim 1 wherein the heated liquid acid solution is heated to temperatures no less than 80 degrees Celsius.

4. The method of claim 3 wherein the cellulosic material at step (b) is heated to no less than 120 degrees Celsius.

5. The method of claim 1 wherein the heated liquid acid solution includes sulfuric acid and water.

6. The method of claim 5 wherein the heated liquid acid solution further includes phosphoric acid.

7. The method of claim 6 wherein the acid of the heated liquid acid solution is 70 to 90 percent by volume sulfuric acid and 10 to 30 percent by volume phosphoric acid.

8. The method of claim 5 wherein the heated liquid acid solution further includes a metallic salt.

9. The method of claim 1 wherein the granularizing provides particles having at least one dimension of substantially less than four millimeters.

10. The method of claim 1 further including the step of trapping the steam in a condenser for reuse in the step of washing.

11. The method of claim 1 wherein step (c) is conducted in a vessel freely communicating with the atmosphere.

12. The method of claim 1 further including the step of activating the char using steam or carbon dioxide to form activated carbon.

13. The method of claim 12 wherein the step of activating the char heats the char with microwave energy.

14. The method of claim 1 wherein the liquid acid solution at step (d) is sent to a reclaimer unit to recover the liquid acid solution to be heated at step (c).

15. A method of carbonizing cellulosic materials comprising the steps of:
    (a) granulizing the cellulosic material;
    (b) heating the cellulosic material to above the steam point; and
    (c) combining the heated cellulosic material with a heated liquid acid solution in a weight ratio of at least 0.5:1 liquid acid to cellulosic material to create a mixture at a temperature above a steam point to strip hydroxyl groups from the cellulosic material in a catalytic reaction with the heated acid and to outgas resulting water as steam to produce a low water content char;

wherein the heated liquid acid solution includes sulfuric acid, water and a metallic salt.

* * * * *